US010409195B1

(12) United States Patent
Kiuchi et al.

(10) Patent No.: US 10,409,195 B1
(45) Date of Patent: Sep. 10, 2019

(54) IMAGE FORMING SYSTEM FOR REDUCING ERROR OF IMAGE FORMING SEQUENCE

(71) Applicant: FUJI XEROX CO., LTD., Tokyo (JP)

(72) Inventors: Yutaka Kiuchi, Kanagawa (JP); Yukiko Miyakoshi, Kanagawa (JP); Tomoshi Hara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/049,839

(22) Filed: Jul. 31, 2018

(30) Foreign Application Priority Data

Mar. 22, 2018 (JP) ................................. 2018-053906

(51) Int. Cl.
*G03G 15/08* (2006.01)
*G03G 15/00* (2006.01)

(52) U.S. Cl.
CPC ..... *G03G 15/0865* (2013.01); *G03G 15/5016* (2013.01); *G03G 15/6511* (2013.01); *G03G 15/6529* (2013.01); *H04N 2201/0094* (2013.01)

(58) Field of Classification Search
CPC ........... G03G 15/0865; G03G 15/6582; G03G 15/6585; G03G 2215/00426; G03G 2215/00797; G03G 2215/00805
See application file for complete search history.

(56) References Cited

U.S. PATENT DOCUMENTS

2008/0124099 A1* 5/2008 Koinuma ........... G03G 15/6582
399/40
2016/0342121 A1* 11/2016 Itoh ..................... G03G 15/6585

FOREIGN PATENT DOCUMENTS

JP 2014021876 * 2/2014

* cited by examiner

*Primary Examiner* — Sandra Brase
(74) *Attorney, Agent, or Firm* — JCIPRNET

(57) ABSTRACT

An image forming system includes a first image forming apparatus that includes a first imaging section used to form an image using a colored first developer, a second image forming apparatus that includes a second imaging section used to form the image using a second developer, which a color of the first developer is capable of penetrating, in a case of being laminated on the first developer on a medium, and a third imaging section used to form the image using a third developer which is capable of shading the color of the first developer in a case of being laminated on the first developer on the medium, and an information processing section that transmits information of a print image to the first image forming apparatus and the second image forming apparatus, the information processing section transmitting the information of the print image to the respective imaging sections such that, with respect to a visual recognition direction of the image on the medium, the image formed using the second developer is laminated on a front side in the visual recognition direction rather than the image formed using the third developer and the image formed using the first developer.

19 Claims, 10 Drawing Sheets

FIG. 8

| PAPER | VISUAL RECOGNITION DIRECTION | PURPOSE | SPECIFIC COLOR USING TONER | PRINT SEQUENCE |
|---|---|---|---|---|
| TRANSPARENT PAPER | IMAGE SIDE (COLOR PAPER, PLAIN PAPER) | METALLIC COLOR | SILVER | 2 → 1 |
| | | COLOR FORMATION IMPROVEMENT | WHITE | 2 → 1 |
| | | GOLD·SILVER STAMP | GOLD·SILVER | 1 → 2 |
| | | WHITE STAMP | WHITE | 1 → 2 |
| | | LUSTER | CLEAR | 1 → 2 |
| | NON-IMAGE SIDE | METALLIC COLOR | SILVER | 1 → 2 |
| | | COLOR FORMATION IMPROVEMENT | WHITE | 1 → 2 |
| | | GOLD·SILVER STAMP | GOLD·SILVER | 2 → 1 |
| | | WHITE STAMP | WHITE | 2 → 1 |
| | | LUSTER | CLEAR | 2 → 1 |

IMAGE FORMING SYSTEM FOR REDUCING ERROR OF IMAGE FORMING SEQUENCE

CROSS-REFERENCE TO RELATED APPLICATIONS

This application is based on and claims priority under 35 USC 119 from Japanese Patent Application No. 2018-053906 filed Mar. 22, 2018.

BACKGROUND

(i) Technical Field

The present invention relates to an image forming system.

(ii) Related Art

A technology disclosed in JP2014-021876A is known as a technology for forming an image on one medium plural times using plural image forming apparatuses.

JP-A-2014-021876 discloses a print system which includes a print apparatus that includes a CMYK toner and a toner other than the CMYK toner. In JP2014-021876A, the print apparatus, which receives print data, determines whether or not a print process in another print apparatus is necessary by analyzing the print data. Furthermore, in a case where the print process in the print apparatus itself has a priority, the print apparatus previously performs print (preceding print) in the print apparatus itself by instructing to preserve (wait for) print in a case where the print data is transmitted to another print apparatus. Furthermore, in a case where a printed material, which is printed in the print apparatus itself, is set on a tray of another print apparatus and a print instruction is input, the print process (succeeding print) is performed in another print apparatus.

SUMMARY

Aspects of non-limiting embodiments of the present disclosure relate to an image forming system that prevents errors of an image forming sequence to a medium in a case where an image is acquired using plural image forming apparatuses.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an image forming system including: a first image forming apparatus that includes a first imaging section used to form an image using a colored first developer; a second image forming apparatus that includes a second imaging section used to form the image using a second developer, which a color of the first developer is capable of penetrating, in a case of being laminated on the first developer on a medium, and a third imaging section used to form the image using a third developer which is capable of shading the color of the first developer in a case of being laminated on the first developer on the medium; and an information processing section that transmits information of a print image to the first image forming apparatus and the second image forming apparatus, the information processing section transmitting the information of the print image to the respective imaging sections such that, with respect to a visual recognition direction of the image on the medium, the image formed using the second developer is laminated on a front side in the visual recognition direction rather than the image formed using the third developer and the image formed using the first developer.

BRIEF DESCRIPTION OF THE DRAWINGS

Exemplary example(s) of the present invention will be described in detail based on the following figures, wherein:

FIG. 5A is an explanatory diagram illustrating a screen used to designate a medium to be used, FIG. 5B is an explanatory diagram illustrating a screen used to designate a visual recognition direction, and FIG. 5C is an explanatory diagram illustrating a screen used to designate a color tone;

FIG. 6A is an explanatory diagram illustrating a case of a metallic color and a gold/silver stamp, and FIG. 6B is an explanatory diagram illustrating a case of color formation improvement, a white stamp, and the gold/silver stamp;

FIG. 7A is an explanatory diagram illustrating an example of an image displayed before the image is formed, and FIG. 7B is an explanatory diagram illustrating an example of an image displayed after the image is formed;

FIG. 8 is a table illustrating a print sequence of an image corresponding to the image formation condition;

DETAILED DESCRIPTION

Figure 1:
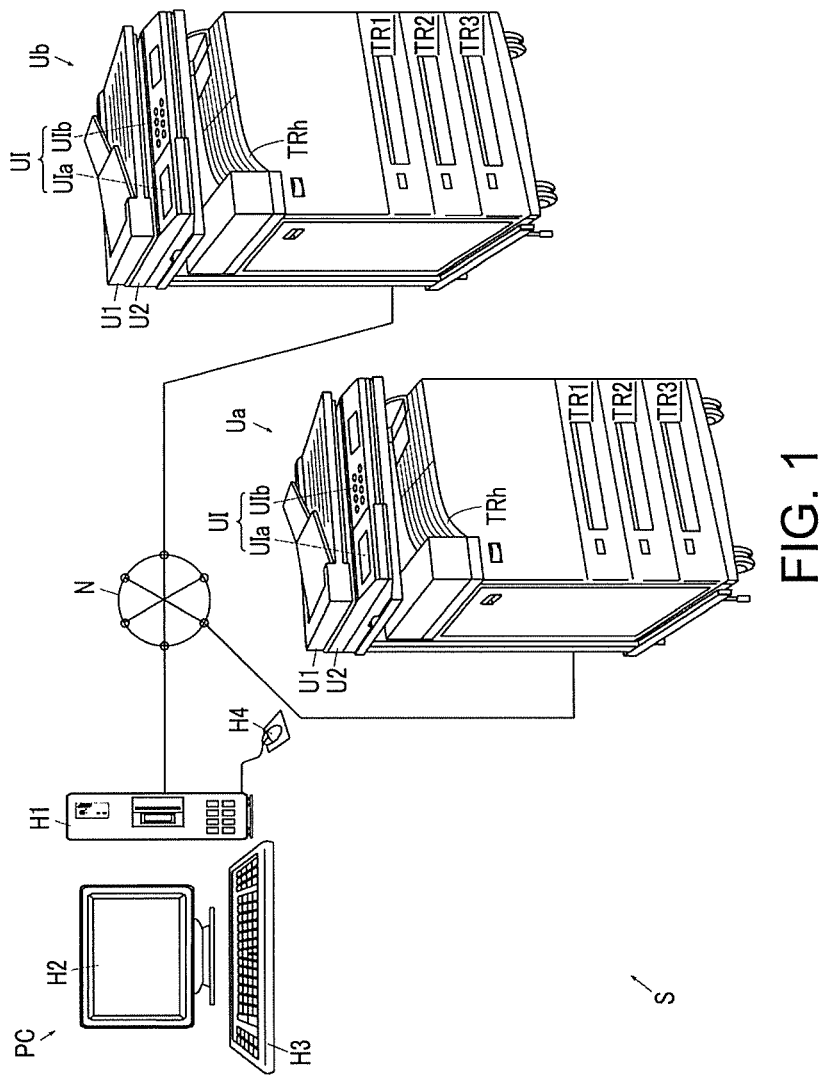
FIG. 1 is an explanatory diagram illustrating a whole image forming system according to a first example of the present invention.

Subsequently, although an example will be described as a detailed example of an exemplary embodiment of the present invention with reference to the accompanying drawings, the present invention is not limited to the example below.

Meanwhile, for easy understanding of description hereinafter, in the drawings, a front and back direction is set to an X-axis direction, a horizontal direction is set to a Y-axis direction, a vertical direction is set to a Z-axis direction, and directions or sides indicated by arrows X, −X, Y, −Y, Z, and −Z are respectively set to a forward, a backward, a right side, a left side, an upper side, a lower side, or a front side, a rear side, a right side, a left side, an upper side, and a lower side.

In addition, in the drawings, a symbol in which "•" is written in "○" means an arrow which faces the front from the rear of a paper surface, a symbol in which "x" is written in "○" means an arrow which faces the rear from the front of the paper surface.

Meanwhile, in description with reference to the drawings below, members other than members, which are necessary for the description for easy understanding, are appropriately omitted.

First Example

FIG. 1 is an explanatory diagram illustrating a whole image forming system according to a first example of the present invention.

In FIG. 1, an image forming system S according to the first example includes a client personal computer PC as an example of an information processing apparatus. The client personal computer PC is connected to a multifunction peripheral U as an example of an image forming apparatus over a network N as an example of a communication line. The multifunction peripheral U according to the first example is a well-known image forming apparatus which is capable of using functions of a copying machine, a printer, a FAX, and a scanner. In the first example, plural multifunction peripherals Ua and Ub are connected to the network N.

Meanwhile, the network N according to the first example includes a so-called Internet line. In addition, the client personal computer PC according to the first example includes a computer apparatus as an example of an electronic calculator.

The client personal computer PC according to the first example includes a computer main body H1 as an example of an apparatus main body. A display H2 as an example of a display section is connected to the computer main body H1. In addition, a keyboard H3 and a mouse H4 as examples of an input section are connected to the computer main body H1. The computer main body H1 includes an HD drive as an example of a storage section which is not illustrated in the drawing, that is, a hard disk drive, a CD drive as an example of a storage medium reading apparatus, that is, a compact disk drive, or the like.

Figure 2:
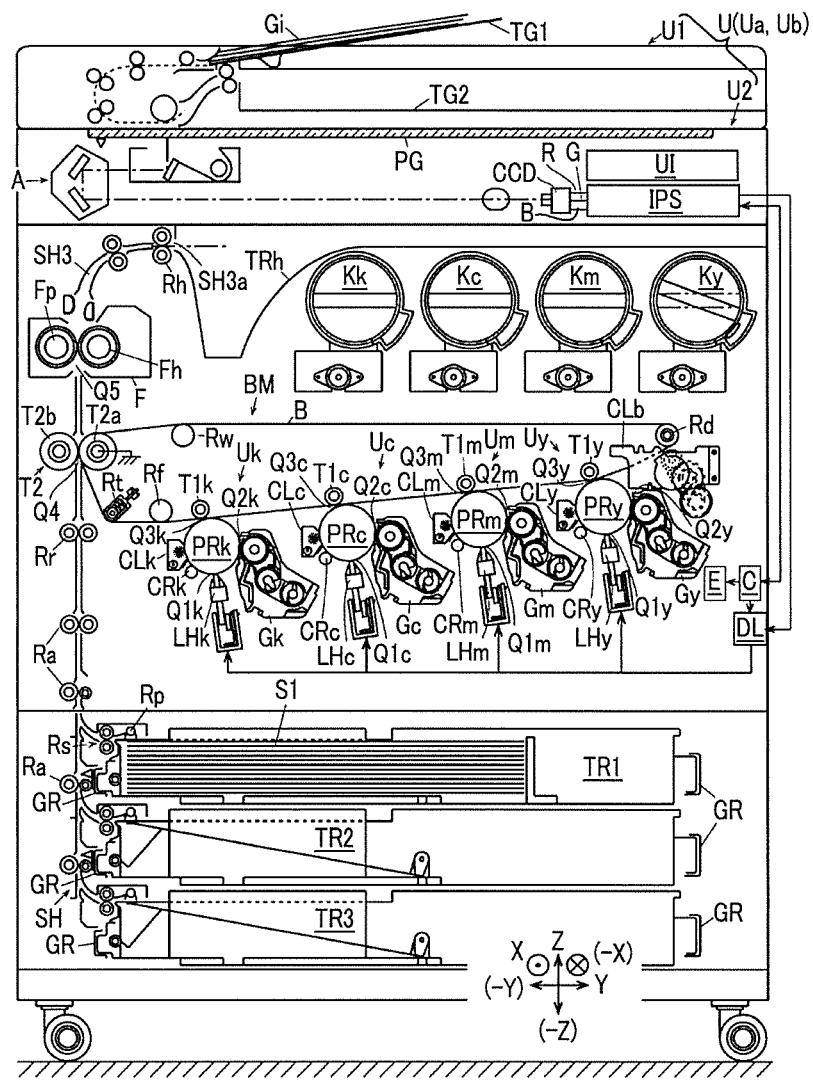
FIG. 2 is an explanatory diagram illustrating a whole image forming apparatus according to the first example of the present invention.

FIG. 2 is an explanatory diagram illustrating the whole image forming apparatus according to the first example of the present invention.

In FIG. 2, the multifunction peripheral U (Ua or Ub) as an example of the image forming apparatus includes an upper document transportation apparatus U1 and a lower apparatus main body U2.

The document transportation apparatus U1 includes a document feeding part TG1. Plural documents Gi, which are desired to be copied, are repeatedly accommodated in the document feeding part TG1. A document ejection part TG2 is disposed on the lower side of the document feeding part TG1. A document Gi, which is fed from the document feeding part TG1 and passes through a document reading location on a document reading surface PG, is discharged to the document ejection part TG2.

The apparatus main body U2 includes an operation part UI used for the user to perform an input operation of a motion command signal, such as start of an image formation action, and an exposure optical system A, and the like. The operation part UI includes a display UIa as an example of a display part, and an input button UIb as an example of an input part. Meanwhile, the display UIa according to the first example includes a so-called touch panel, and is configured to be capable of performing input by touching with a finger of the user. That is, the display UIa has a function of the input part.

Light, which is reflected from a document transported on the document reading surface PG in the document transportation apparatus U1 or a document manually placed on the document reading surface PG, is converted into red (R), green (G), and blue (B) electronic signals by a solid-state image sensing device CCD through the exposure optical system A.

In a first multifunction peripheral Ua, an information conversion part IPS converts the RGB electronic signals, which are input from the solid-state image sensing device CCD, and print information, which is transmitted from the client personal computer PC, into pieces of image information of black (K), yellow (Y), magenta (M), and cyan (C), temporarily stores the pieces of image information, and outputs the pieces of image information as latent image formation image information to a writing circuit DL during a previously set period.

Meanwhile, in a case where a document image is a single color image, that is, a so-called monochrome image, only the image information of black (K) is input to the writing circuit DL.

Meanwhile, in the first example, the first multifunction peripheral Ua is configured to form an image using four-colored developer including colors of Y, M, C, and K as an example of a first developer. In addition, the second multifunction peripheral Ub is configured to form an image using a transparent developer as an example of a second developer, which the colors of Y, M, C, and K developers may penetrate, and three developers of colors of gold, silver, and white as an example of a third developer which is capable of shading the colors of the Y, M, C, and K developers.

In the description below, although the first multifunction peripheral Ua and the second multifunction peripheral Ub use different developers but have identical configurations. Therefore, the first multifunction peripheral Ua will be described and the second multifunction peripheral Ub will not be described in detail.

The writing circuit DL includes respective driving circuits, which are not illustrated in the drawing, of the respective colors of Y, M, C, and K, and outputs a signal according to the input image information to LED heads LHy, LHm, LHc, and LHk as examples of a latent image forming device during the previously set period. Meanwhile, in the first example, the LED heads LHy to LHk are configured by an LED array in which LEDs as an example of a light emitting element are linearly arranged along a width direction of an image. In the LED heads LHy to LHk, the LEDs emit light according to the input signal. Therefore, the LED heads LHy to LHk output writing light according to an input signal.

Figure 3:
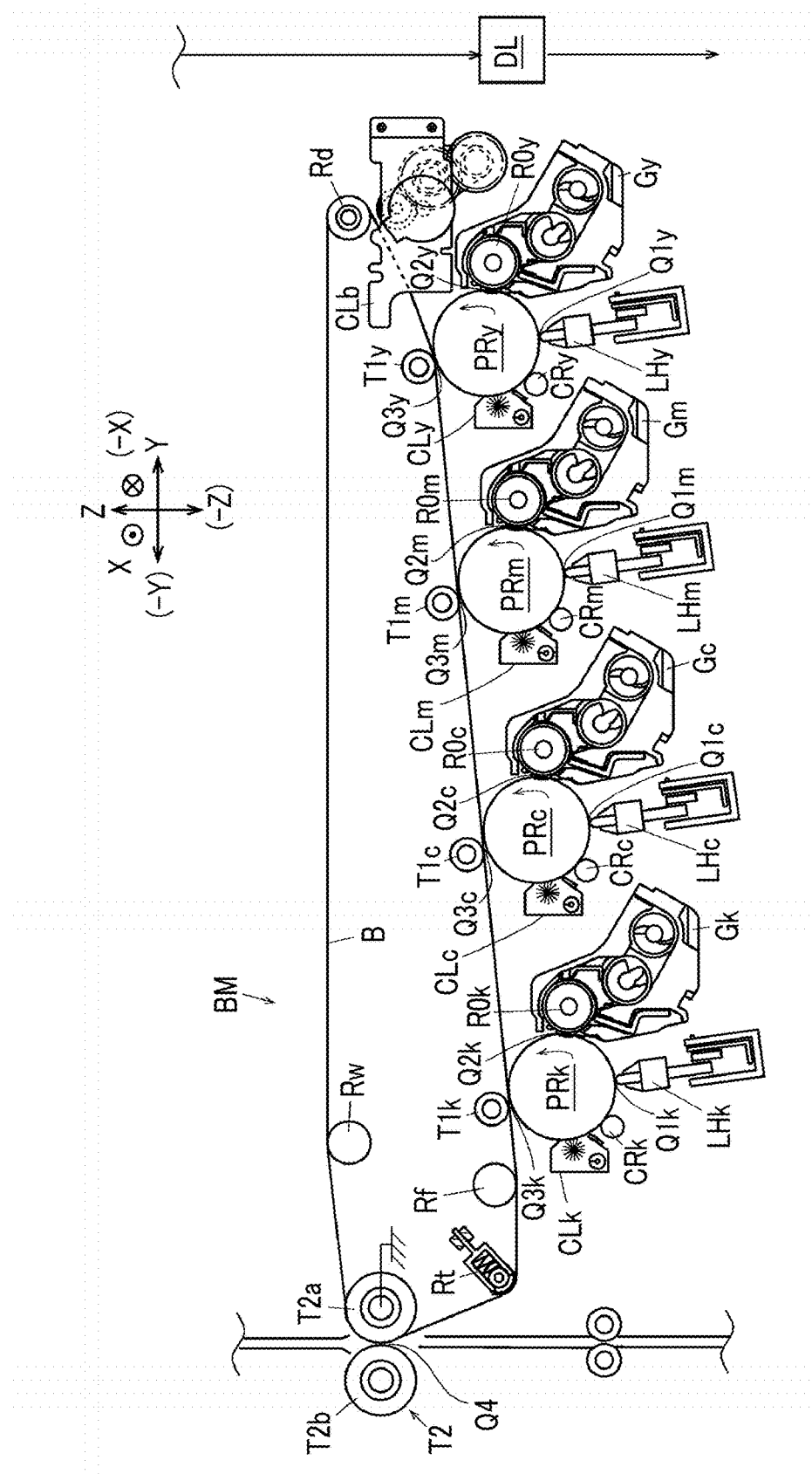
FIG. 3 is an enlarged explanatory diagram illustrating major parts of the image forming apparatus according to the first example.

FIG. 3 is an enlarged explanatory diagram illustrating major parts of the image forming apparatus according to the first example.

In FIGS. 2 and 3, photoreceptors PRy, PRm, PRc, and PRk as examples of image holders are disposed on an upper side of the respective LED heads LHy to LHk.

On upstream sides of the LED heads LHy to LHk with respect to rotation directions of the respective photoreceptors PRy, PRm, PRc, and PRk, charging rollers CRy, CRm, CRc, and CRk as examples of chargers are disposed to be in contact with the photoreceptors PRy to PRk. On downstream sides of the LED heads LHy to LHk with respect to the rotation directions of the photoreceptors PRy to PRk, development devices Gy, Gm, Gc, and Gk are disposed. On downstream sides of the development devices Gy to Gk with respect to the rotation directions of the photoreceptors PRy to PRk, primary transfer rollers T1y, T1m, T1c, and T1k as examples of primary transfer units are disposed. On downstream sides of the primary transfer rollers T1y to T1k with respect to the rotation directions of the photoreceptors PRy to PRk and photoreceptor cleaners CLy, CLm, CLc and CLk as examples of cleaners of the image holders are disposed.

An imaging part (first imaging section) Uy of the color of Y, as an example of an apparatus for forming a visible image of the color of Y, according the first example is configured in which a toner image as an example of the visible image is formed using the photoreceptor Pry of the color of Y, the charging roller Cry, the LED head LHy, the development device Gy, the primary transfer roller T1y, and the photoreceptor cleaner CLy. Similarly, imaging parts (first imaging sections) Um, Uc, and Uk of the colors of M, C, and K are configured with the respective photoreceptors PRm, PRc, and PRk, the charging rollers CRm, CRc, and CRk, the LED heads LHm, LHc, and LHk, the development devices Gm, Gc, and Gk, the primary transfer rollers T1m, T1c, and T1k, and the photoreceptor cleaners CLm, CLc, and CLk. Meanwhile, the second multifunction peripheral Ub is also provided with imaging parts (third imaging sections) corresponding gold, silver, and white, and an imaging part (second imaging section) corresponding to the transparent developer.

A belt module BM as an example of an intermediate transfer apparatus is disposed on the upper sides of the photoreceptors PRy to PRk. The belt module BM is an example of the image holder, and includes an endless belt-shaped intermediate transfer belt B as an example of an intermediate transfer object. The intermediate transfer belt B is rotatably supported by a belt driving roller Rd as an example of a driving member, a tension roller Rt as an example of a stretch member, a working roller Rw as an example of a member which corrects deviation, an idler roller Rf as an example of a driven member, a back-up roller T2a as an example of a member which faces a secondary transfer area, and the primary transfer rollers T1y, T1m, T1c, and T1k.

A secondary transfer roller T2b as an example of a secondary transfer member is disposed in a location which faces the back-up roller T2a while interposing the intermediate transfer belt B. In the first example, the back-up roller T2a is grounded, and a secondary transfer voltage having charged polarity and antipolarity of the toner is applied to the secondary transfer roller T2b from a power circuit E. A secondary transfer unit T2 according to the first example is configured with the back-up roller T2a and the secondary transfer roller T2b. In addition, a secondary transfer area Q4 is formed with an area in which the secondary transfer roller T2b is in contact with the intermediate transfer belt B.

A belt cleaner CLb as an example of the cleaner of the intermediate transfer object is disposed on a downstream side of the secondary transfer area Q4 with respect to a rotation direction of the intermediate transfer belt B. A transfer apparatus T1+T2+B according to the first example is configured with the primary transfer rollers T1y to T1k, the intermediate transfer belt B, the secondary transfer unit T2, and the like. In addition, an image recording part Uy to Uk+T1+T2+B according to the first example is configured with the imaging parts Uy to Uk and the transfer apparatus T1+T2+B.

Toner cartridges Ky, Km, Kc, and Kk as examples of developer reception containers are detachably mounted on an upper side of the belt module BM.

In FIG. 2, a pair of left and right guide rails GR as an example of a guide member is provided in 3 stages on the lower side of the imaging parts Uy to Uk. In the respective guide rails GR, paper feeding trays TR1 to TR3 as examples of paper feeding sections are supported to be able to enter or exit in the front and back direction. A recording sheet S1 as an example of a medium is accommodated in each of the paper feeding trays TR1 to TR3.

A pick-up roller Rp as an example of an extraction member is disposed on an upper left side of each of the paper feeding trays TR1 to TR3. A separating roller Rs as an example of a separating member is disposed on a downstream side of the pick-up roller Rp with respect to a transport direction of the recording sheet S1. A paper feeding path SH as an example of a medium transport path, which extends to the upper side, is formed on a downstream side of the separating roller Rs with respect to the transport direction of the recording sheet S1. Plural transport rollers Ra as examples of transport members are disposed on the paper feeding path SH.

A register roller Rr as an example of a transport period adjustment member is disposed on an upstream side of the secondary transfer area Q4 on the paper feeding path SH.

A fixing apparatus F is disposed on a downstream side of the secondary transfer area Q4 with respect to the transport direction of the recording sheet S1. The fixing apparatus F includes a heating roller Fh as an example of a fixing member for heating, and a pressurization roller Fp as an example of a fixing member for pressurization. A fixing area Q5 is configured with an area in which the heating roller Fh is in contact with the pressurization roller Fp.

A paper ejection path SH3 as an example of a transport path is disposed on an upper side of the fixing apparatus F. The paper ejection path SH3 as an example of a medium exhaust part extends toward a paper ejection tray TRh which is formed on an upper surface of the apparatus main body U2. A paper ejection roller Rh as an example of a medium transport member is disposed in an exhaust port SH3a at a downstream end of the paper ejection path SH3.

Description of Function of Multifunction Peripheral

In the multifunction peripheral U, which has the above-described configuration, according to the first example, the pieces of image information, which are read in the solid-state image sensing device CCD, and the print information, which is transmitted from the client personal computer PC, are converted into pieces of Y, M, C, and K image information. The LED heads LHy to LHk are controlled according to the prices of image information acquired through the conversion, and thus the writing light is output.

Each of the photoreceptors PRy to PRk is driven to rotate in a case where the image formation starts. A charging voltage is applied to the charging rollers CRy to CRk from the power circuit E. Therefore, surfaces of the photoreceptors PRy to PRk are charged by the charging rollers CRy to CRk. An electrostatic latent image is formed on surfaces of the charged photoreceptors PRy to PRk due to the writing light from the LED heads LHy to LHk in writing locations Q1y, Q1m, Q1c, and Q1k. The electrostatic latent image of the photoreceptors PRy to PRk is developed on the toner image as the example of the visible image by development rollers R0y, R0m, R0c, and R0k of the development devices Gy, Gm, Gc, and Gk in development areas Q2y, Q2m, Q2c, and Q2k. In a case where the developers are consumed in the development devices Gy to Gk, the developers are supplied from the toner cartridges Ky to Kk according to the amount of consumption.

The developed toner image is transported to primary transfer areas Q3y, Q3m, Q3c, and Q3k which are in contact with the intermediate transfer belt B as an example of the intermediate transfer object. A primary transfer voltage having the charged polarity and the antipolarity of the toner is applied to the primary transfer rollers T1y to T1k, which are disposed on the rear surface side of the intermediate transfer belt B in the primary transfer areas Q3y, Q3m, Q3c, and Q3k, from the power circuit E, which is controlled by a control unit C, during the previously set period. Therefore, the toner image on each of the photoreceptors PRy to PRk is transferred to the intermediate transfer belt B by the primary transfer rollers T1y to T1k. Meanwhile, in a case of a multicolor toner image, the toner image on a downstream side is repeatedly transferred on the toner image transferred to the intermediate transfer belt B in the upstream-side primary transfer areas.

A residual material and an adhesive material of the photoreceptors PRy to PRk, which remain after the primary transfer is performed, are cleaned by the photoreceptor cleaners CLy to CLk. The surfaces of the cleaned photoreceptors PRy to PRk are charged again by the charging rollers CRy to CRk.

The monochrome or multicolor toner image, which is transferred on the intermediate transfer belt B by the primary transfer rollers T1y to T1k in the primary transfer area Q3y to Q3k, is transported to the secondary transfer area Q4.

The recording sheet S1, on which the image is recorded, is extracted by the pick-up roller Rp of any one of the paper feeding trays TR1 to TR3 to be used. In a case where plural recording sheets S1 are repeatedly extracted, the recording sheets S1, which are extracted by the pick-up roller Rp, are separated one by one by the separating roller Rs. The recording sheets S1, which are separated by the separating roller Rs, are transported through the paper feeding path SH by the transport roller Ra. The recording sheets S1, which are transported through the paper feeding path SH, are transmitted to the register roller Rr.

The register roller Rr transports the recording sheets S1 to the secondary transfer area Q4 while matching a period during which the toner image formed on the intermediate transfer belt B is transported to the secondary transfer area Q4. The secondary transfer voltage, which has the charged polarity and the antipolarity of the toner, is applied to the secondary transfer roller T2b by the power circuit E. Therefore, the toner image on the intermediate transfer belt B is transferred from the intermediate transfer belt B to the recording sheet S1.

After the secondary transfer is performed, the intermediate transfer belt B is cleaned by the belt cleaner CLb as an example of an intermediate transfer object cleaner.

The recording sheets S1, on which the toner image is secondarily transferred, are heated and fixed in a case where the recording sheets S1 pass through the fixing area Q5.

The recording sheets S1, to which the image is fixed, are transported to the paper ejection path SH3. The recording sheets S1, which are transported through the paper ejection path SH3, are exhausted to the paper ejection tray TRh by the paper ejection roller Rh.

Description of Control Unit According to First Example

Figure 4:
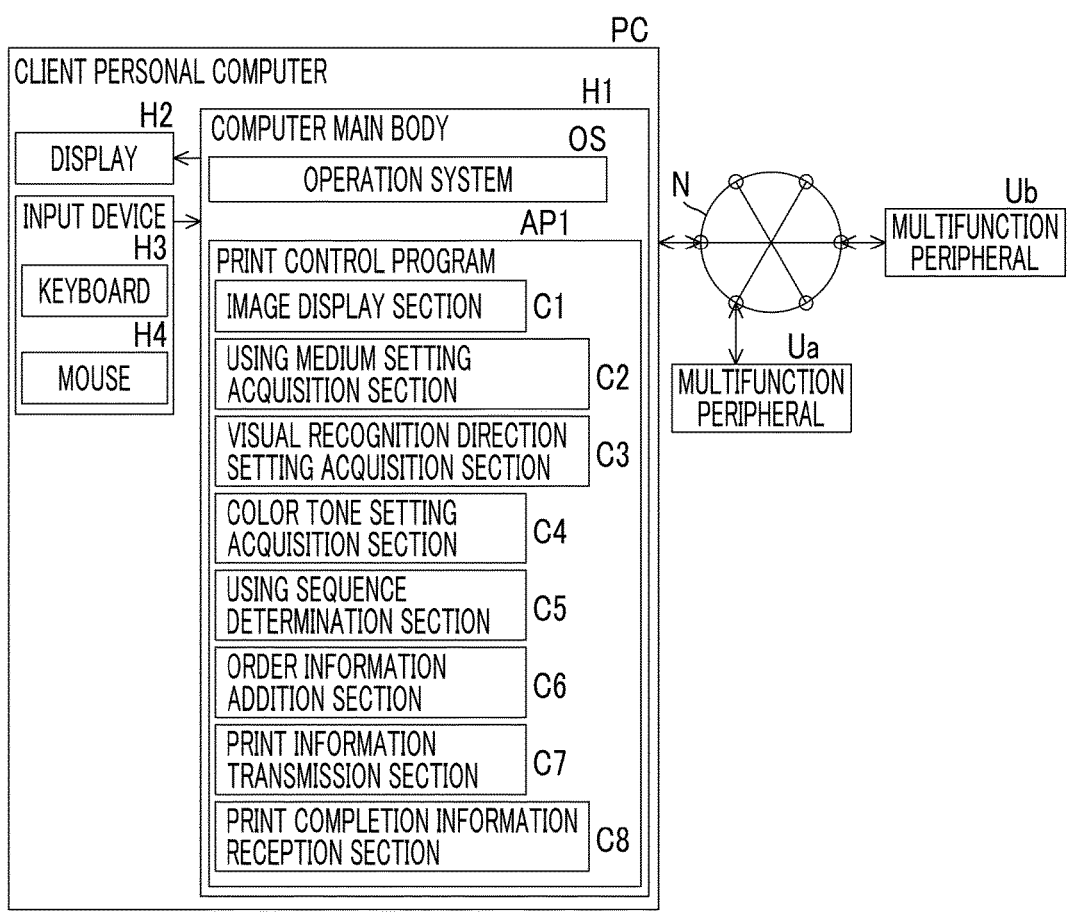
FIG. 4 is a functional block diagram illustrating respective functions included in a control unit of a client personal computer according to the first example.

FIG. 4 is a functional block diagram illustrating respective functions included in the control unit of the client personal computer according to the first example.

Description of Control Unit of Client Personal Computer PC

In FIG. 4, the computer main body H1 of the client personal computer PC includes an I/O, that is, an input/output interface. The input/output interface performs input/output of a signal to/from the outside, adjustment of an input/output signal level, and the like. In addition, the computer main body H1 includes a ROM, that is, a read only memory. The read only memory stores a program, data, and the like which are used to perform a necessary process. In addition, the computer main body H1 includes a RAM, that is, a random access memory. The random access memory temporarily stores necessary data. In addition, the computer main body H1 includes a CPU, that is, a central processing unit. The central processing unit performs a process according to the program which is stored in the hard disk or the like. In addition, the computer main body H1 includes a clock oscillator or the like.

The client personal computer PC is capable of realizing various functions by executing the program stored in the hard disk, the ROM, or the like.

The hard disk of the client personal computer PC stores an operating system OS as basic software. The operating system OS controls a basic action of the computer apparatus.

In addition, the hard disk of the client personal computer PC stores a print control program AP1 as an example of application software. The print control program AP1 controls print by transmitting the print information and a control signal to each to the multifunction peripherals Ua and Ub according to print setting according to the input of the user.

Meanwhile, the hard disk of the client personal computer PC stores an application program, such as word processing software as document creating software, which is not illustrated in the drawing, or electronic mail transmitting software.

Hereinafter, each of the functions (controllers) of the print control program AP1 will be described except a well-known operating system OS according to the related art and an application program which is not illustrated in the drawing.

Print Control Program AP1

The print control program AP1 includes subsequent functions C1 to C8.

Figure 5A:
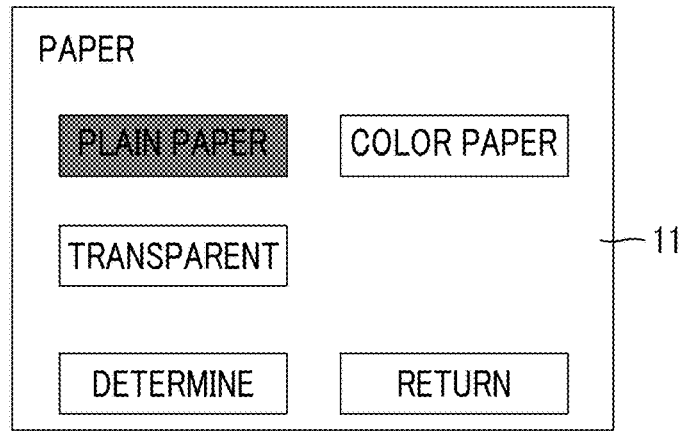
FIGS. 5A to 5C are explanatory diagrams illustrating a display screen which designates an image formation condition according to the first example.
Figure 5B:
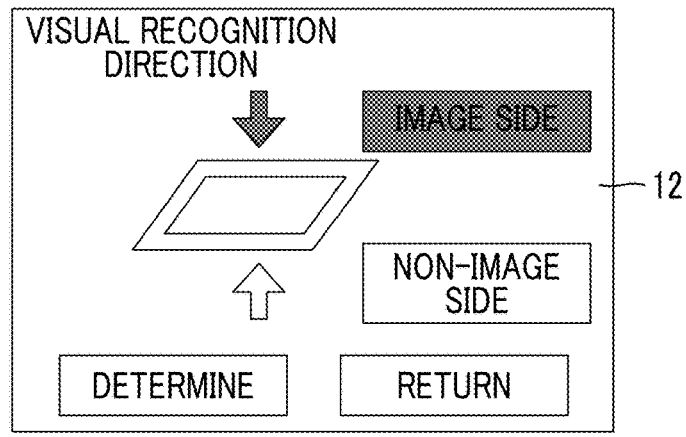
Figure 5C:
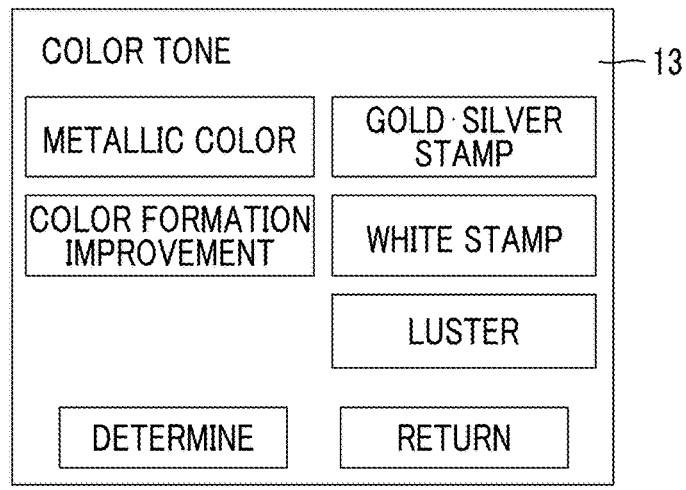

FIGS. 5A to 5C are explanatory diagrams illustrating a display screen which designates an image formation condition according to the first example, FIG. 5A is an explanatory diagram illustrating a screen used to designate a medium to be used, FIG. 5B is an explanatory diagram illustrating a screen used to designate a visual recognition direction, and FIG. 5C is an explanatory diagram illustrating a screen used to designate a color tone.

The image display section C1 displays an image, which is used to designate the image formation condition on the client personal computer PC, on the display H2. In FIGS. 5A to 5C, in a case where a document, an image, or the like is printed and an input (print setting input) is performed to designate the image formation condition, the image display section C1 according to the first example displays a medium type designation image 11, which is used to designate a type of the recording sheet S1, as illustrated in FIG. 5A. The medium type designation image 11 is configured such that it is possible to select or designate any one of plain paper, color paper, and a transparent sheet.

In a case where determination is input in the medium type designation image 11, the image display section C1 displays a visual recognition direction designation image 12 used to designate the visual recognition direction, as illustrated in FIG. 5B. In the visual recognition direction designation image 12, it is possible to designate a direction in which the printed recording sheet S1 is viewed. Specifically, in a case of the transparent sheet, it is possible to designate whether to view from a print surface side (an image surface or a front side of the sheet) or to view from a non-image surface side (a rear side of the sheet). For example, in a case where a label of a pet bottle container is printed and the label is wound on the pet bottle container such that a non-image surface becomes an outside, an image printed on an inner side is not damaged even though scratches are formed on an outside surface. Therefore, in a case where print is performed for such a purpose, the visual recognition direction becomes the non-image surface side. Meanwhile, the first example is configured such that it is possible to designate both an image surface side and the non-image surface side as the visual recognition direction.

Figure 6A:
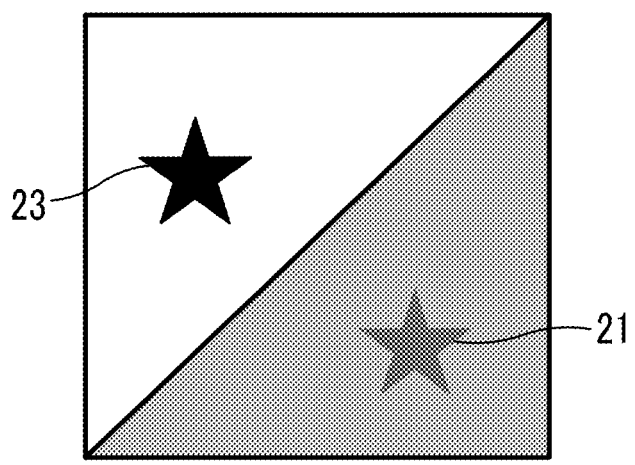
FIGS. 6A and 6B are explanatory diagrams illustrating an example of an image to be formed.
Figure 6B:
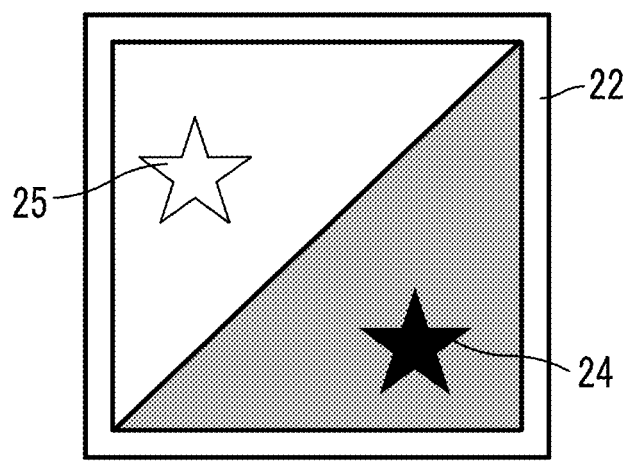

FIGS. 6A and 6B are explanatory diagrams illustrating an example of an image to be formed, FIG. 6A is an explanatory diagram illustrating a case of metallic color and a gold/silver stamp, and FIG. 6B is an explanatory diagram illustrating a case of color formation improvement, a white stamp, and the gold/silver stamp.

In addition, in a case where an input of determination is performed in the visual recognition direction designation image 12, the image display section C1 displays a color tone designation image 13 used to designate the color tone illustrated in FIG. 5C. In FIG. 5C, in the color tone designation image 13 according to the first example, it is possible to designate color tones of the metallic color, color formation improvement, the gold/silver stamp, the white stamp, and luster. The metallic color is designated in a case of forming an image which has metallic luster (metallic) by superimposing images of Y, M, C, and K on a surface of an image of silver. For example, in a case where the image of silver is used as a base and the image of Y is superimposed on the surface of the image of silver in FIG. 6A, it is possible to form an image viewed as an image 21 of a color of yellow, which has the metallic luster.

The color formation improvement is used in a case where the images of Y, M, C, and K are repeatedly printed on a surface of a white image. Specifically, in a case where the color paper or the transparent recording sheet S1 is used and the images of Y, M, C, and K are directly formed, there is a case where a color of the color paper is viewed as a mixed color or the transparent sheet is seen through and the color tone is changed. In contrast, in a case where a white image 22 is used as the base as illustrated in FIG. 6B, color formation of the images of Y, M, C, and K is improved (clearly viewed) even in a case where the color paper or the transparent sheet is used.

In a case where developers, which have light shading features, of gold, silver, and white are superimposed on the images of Y, M, C, and K for gold, silver, and white parts of the image, it is possible for the gold/silver stamp or the white stamp to form an image which is sealed (stamped) by gold 23, silver 24, and white 25, as illustrated in FIGS. 6A and 6B.

In a case where a transparent developer layer is superimposed on the images of Y, M, C, and K, the images of Y, M, C, and K are in a state of being covered (coated) by a transparent film, and thus it is possible to apply the luster to the images.

Figure 7A:
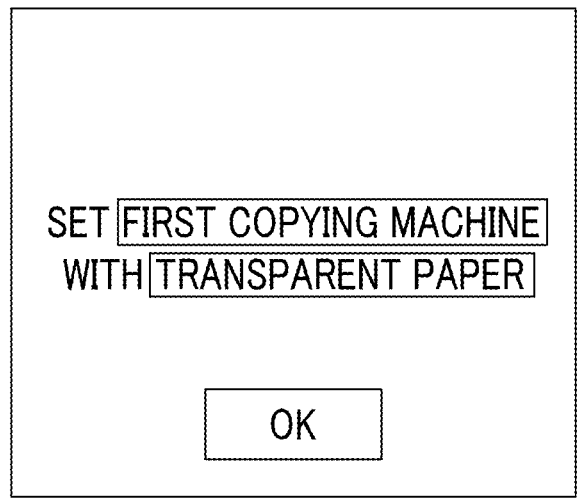
FIGS. 7A and 7B are explanatory diagrams illustrating an example of a display image according to the first example.
Figure 7B:
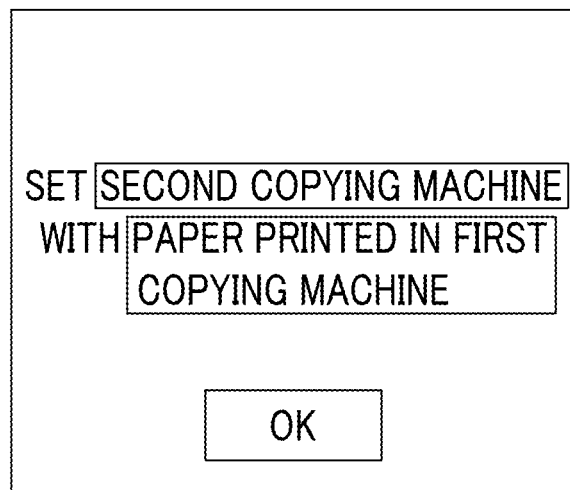

FIGS. 7A and 7B are explanatory diagrams illustrating an example of a display image according to the first example, FIG. 7A is an explanatory diagram illustrating an example of an image displayed before the image is formed, and FIG. 7B is an explanatory diagram illustrating an example of an image displayed after the image is formed.

In addition, in a case where a print start input is performed in the client personal computer PC, the image display section C1 according to the first example displays an image which has a gist of setting the recording sheet S1 to any of the multifunction peripherals Ua and Ub, which performs subsequent print, on the display H2, as illustrated in FIGS. 7A and 7B. Here, the multifunction peripheral corresponding to an initial print sequence displays the multifunction peripheral Ua, in which print is performed, and a designated recording sheet S1, as illustrated in FIG. 7A. The multifunction peripheral Ua or Ub corresponding to a second print sequence performs display used to set the multifunction peripheral Ub, in which print is performed, and a completely recorded recording sheet S1, as illustrated in FIG. 7B.

The using medium setting acquisition section C2 acquires a type of the designated recording sheet S1, that is, using medium setting information according to input performed in the medium type designation image 11.

The visual recognition direction setting acquisition section C3 acquires designated visual recognition direction setting information according to input performed in the visual recognition direction designation image 12.

The color tone setting acquisition section C4 acquires designated color tone setting information according to input performed in color tone designation image 13.

FIG. 8 is a table illustrating a print sequence of an image corresponding to the image formation condition.

The using sequence determination section C5 determines the print sequence of images acquired using the Y, M, C, and K developers, images acquired using the transparent developer, and images acquired using the developers of gold, silver, and white based on designation of the image formation condition, and determines a using sequence to use each of the multifunction peripherals Ua and Ub, in which the image is formed, based on the determined print sequence.

In FIG. 8, the using sequence determination section C5 according to the first example determines the using sequence such that print is performed in order of the second multifunction peripheral Ub and the first multifunction peripheral Ua in a case where a designation, in which an image of the second multifunction peripheral Ub is laminated on a back side (becomes the base) with respect to the visual recognition direction, is performed, specifically, in a case where a designation of the metallic color or the color formation improvement is performed.

In addition, in a case where a designation, in which the images of the second multifunction peripheral Ub, such as the gold/silver stamp, the white stamp, or the luster, are laminated on a front surface side, is performed, the using sequence is determined such that print is performed in order of the first multifunction peripheral Ua and the second multifunction peripheral Ub.

Meanwhile, for example, in a case where a designation, in which the image of the second multifunction peripheral Ub is used for both the base and the front surface, is performed as in a case where both designations of the color formation improvement (and/or the metallic color) and the luster are performed, the using sequence is determined such that print is performed in order of the second multifunction peripheral Ub (base of the color of white (and/or silver)), the first multifunction peripheral Ua (images of Y, M, C, and K), and the second multifunction peripheral Ub (transparent).

In addition, in a case where the visual recognition direction is set to both sides and the color formation improvement is designated, the using sequence is determined such that print is performed in order of the first multifunction peripheral Ua (images of Y, M, C, and K on the back side), the second multifunction peripheral Ub (base of the color of white), and the first multifunction peripheral Ua (images of Y, M, C, and K on the front side).

Furthermore, in a case where the visual recognition direction is set to the both sides and the color formation improvement and the luster are designated, the using sequence is determined such that print is performed in order of the second multifunction peripheral Ub (transparent on the back side), the first multifunction peripheral Ua (images of Y, M, C, and K on the back side), the second multifunction peripheral Ub (base of the color of white), the first multifunction peripheral Ua (images of Y, M, C, and K on the front side), and the second multifunction peripheral Ub (transparent on the front side).

The order information addition section C6 adds order information to the print information, which is transmitted to each of the multifunction peripherals Ua and Ub, in a case where print is performed using the plural multifunction peripherals Ua and Ub. As an example, in a case where the using sequence indicates order of the second multifunction peripheral Ub and the first multifunction peripheral Ua, the order information which indicates "Print will be subsequently performed in the first multifunction peripheral Ua" is added to the print information which is transmitted to the second multifunction peripheral Ub, and the order information which indicates "an image forming apparatus, in which print will be subsequently performed, does not exist" is added to the print information which is transmitted to the first multifunction peripheral Ua.

The print information transmission section (information processing section) C7 transmits the print information to each of the multifunction peripherals Ua and Ub. The first example is configured such that the print information is transmitted to the multifunction peripheral Ua or Ub, in which print will be subsequently performed in a case where print is performed in such a way that the plural multifunction peripherals Ua and Ub are used in order, and the print information is transmitted to the subsequent multifunction peripheral Ua or Ub in a case where print completion information is received from the multifunction peripheral Ua or Ub. That is, the first example is configured such that the print information is not transmitted to the multifunction peripheral Ua or Ub which does not correspond to the print order.

The print completion information reception section C8 receives the print completion information which is transmitted from each of the multifunction peripherals Ua and Ub.

Description of Control Unit of Image Forming Apparatus

Figure 9:
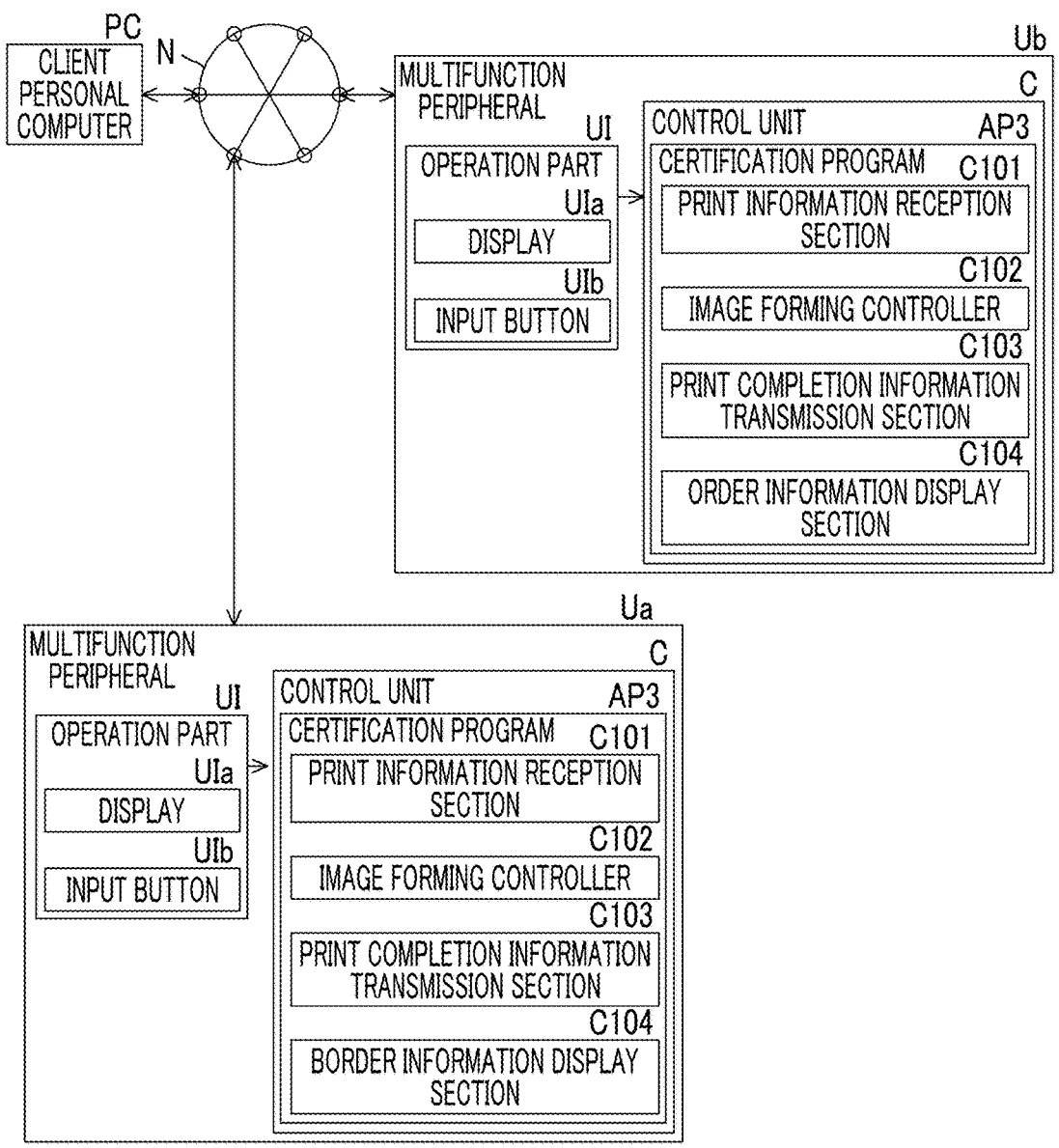
FIG. 9 is a functional block diagram illustrating functions included in a multifunction peripheral according to the first example.

FIG. 9 is a functional block diagram illustrating functions included in a multifunction peripheral according to the first example.

Meanwhile, hereinafter, the control unit C of the first multifunction peripheral Ua will be described. Since the second multifunction peripheral Ub is identical to the first multifunction peripheral Ua, the description thereof will not be repeated.

The control unit C of the first multifunction peripheral Ua according to the first example includes an input/output interface I/O which performs signal input/output or the like with the outside. In addition, the control unit C includes a Read Only Memory (ROM) which stores a program AP3, information, and the like used to perform a necessary process. In addition, the control unit C includes a Random Access Memory (RAM) used to temporarily store necessary data. In addition, the control unit C includes a Central Processing Unit (CPU) which performs a process according to the program stored in the ROM or the like. Therefore, the control unit C according to the first example includes a small-sized information processing apparatus, that is, a so-called microcomputer. Accordingly, the control unit C is capable of realizing various functions by executing the program stored in the ROM or the like.

Signal Output Element Connected to Control Unit C

Output signals from the operation part UI and signal output elements, such as various sensors, which are not illustrated in the drawing, are input to the control unit C.

The operation part UI includes the display UIa, the input button UIb, and the like. Meanwhile, the input button UIb according to the first example includes a start key, which is used to start the image formation action, ten keys, arrow keys, and the like.

Function of Control Unit C

The control unit C has a function of performing a process according to the input signals from the signal output elements and outputting the control signal to each of the control elements. That is, the control unit C includes subsequent functions C101 to C104.

The print information reception section C101 receives the print information which is transmitted from the client personal computer PC.

The image forming controller C102 performs a job, which is the image formation action, by controlling reading of the document transportation apparatus U1, driving of the respective members by the apparatus main body U2, a period of applying each of the voltages, and the like.

In a case where print of the print information, which is transmitted from the client personal computer PC, is completed, the print completion information transmission section C103 transmits the print completion information, which notifies that print is completed, toward the client personal computer PC.

The order information display section C104 performs display on the display UIa based on the order information which is added to the print information transmitted from the client personal computer PC. In a case where the print information, to which the order information is added, is received from the client personal computer PC, an image, which is used to check the medium, is displayed on the display UIa, similar to FIG. 6A. Meanwhile, the first example is configured such that, in a case where the print information, to which the order information is added, is received, the user checks the print information on the display UIa, and, in a case where the start key is input, the job starts. Thereafter, in a case where print is completed in the first multifunction peripheral Ua and print is subsequently performed in the second multifunction peripheral Ub, an image used to prompt a medium, which is printed in the first multifunction peripheral Ua, to set to the second multifunction peripheral Ub is displayed, similar to FIG. 6B.

Description of Flowchart of Print Control Process According to First Example

Figure 10:
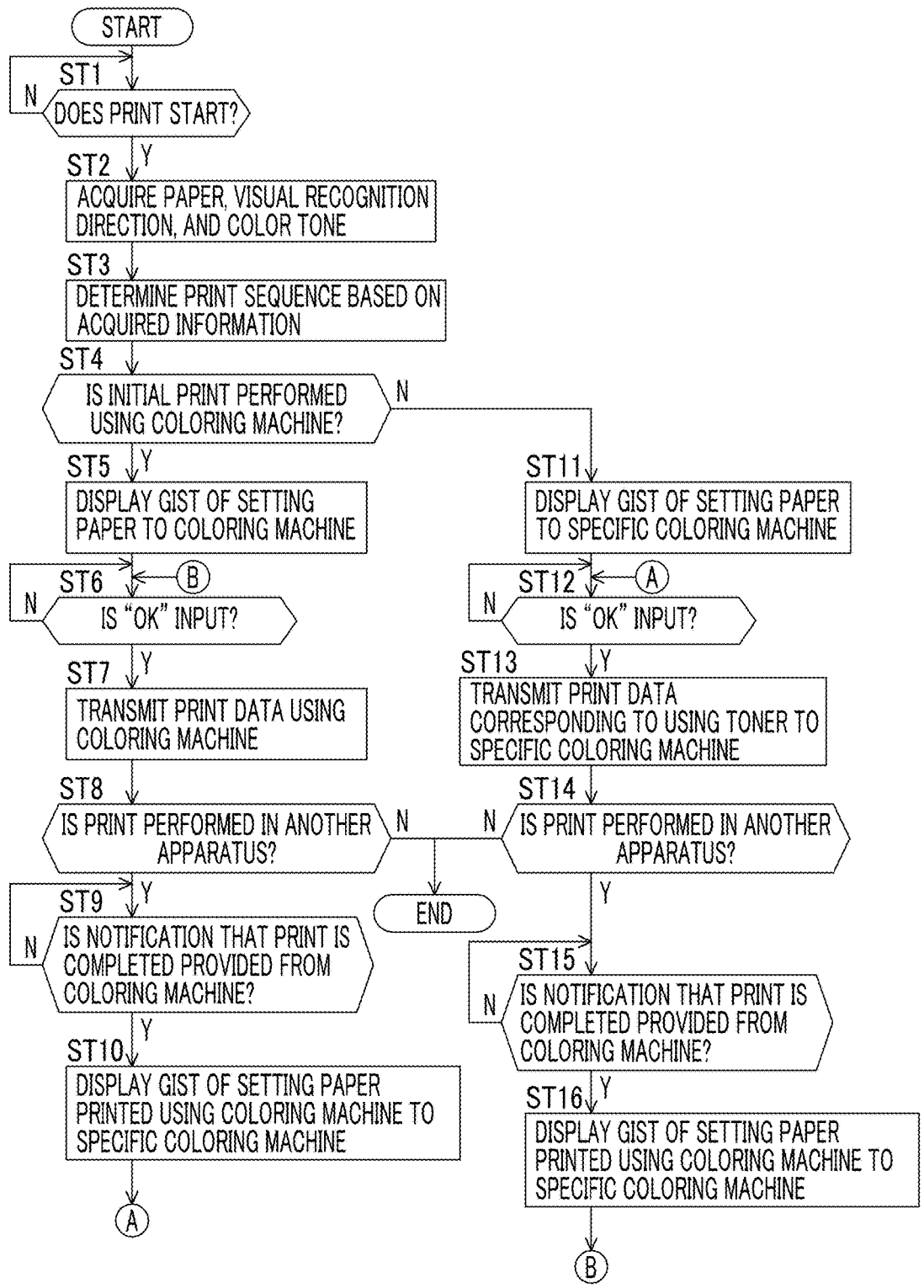
FIG. 10 is a flowchart illustrating a print control process according to the first example of the present invention.

FIG. 10 is a flowchart illustrating a print control process according to the first example of the present invention.

Processes in respective STs (steps) of the flowchart of FIG. 10 are performed according to the print control program of the client personal computer PC. In addition, the processes are performed in a multitasking manner in parallel to other various processes of the control unit.

Meanwhile, a process for displaying an image used to designate the image formation condition and a process for displaying an image on the display UIa of each of the multifunction peripherals Ua and Ub are not illustrated in the drawing and detailed description thereof will not be performed.

A flow of the flowchart illustrated in FIG. 10 starts in a case where the print control program AP1 is started.

In ST1 of FIG. 10, it is determined whether or not a print start input is performed.

In a case of YES (Y), the process proceeds to ST2. In a case of NO (N), ST1 is repeated.

In ST2, information of designation of the image formation condition (the paper, the visual recognition direction, or the color tone) is acquired. Thereafter, the process proceeds to ST3.

In ST3, the print sequence is determined based on information of the acquired image formation condition. Thereafter, the process proceeds to ST4.

In ST4, it is determined whether or not initial print is performed in a coloring machine (first multifunction peripheral Ua). In a case of YES (Y), the process proceeds to ST5. In a case of NO (N), the process proceeds to ST11.

In ST5, display (refer to FIG. 6A), which has a gist of setting a designated type of recording sheet S1 to the first multifunction peripheral Ua, is performed. Thereafter, the process proceeds to ST6.

In ST6, it is determined whether or not "OK" input is performed in the displayed image. In a case of YES (Y), the process proceeds to ST7. In a case of NO (N), ST6 is repeated.

In ST7, the print data is transmitted to the first multifunction peripheral Ua. Thereafter, the process proceeds to ST8.

In ST8, it is determined whether or not print is performed in another apparatus (second multifunction peripheral Ub). In a case of YES (Y), the process proceeds to ST9. In a case of NO (N), the print control process ends.

In ST9, it is determined whether or not a notification of the print completion is provided from the first multifunction peripheral Ua. In a case of YES (Y), the process proceeds to ST10. In a case of NO (N), ST9 is repeated.

In ST10, display (refer to FIG. 6B), which has a gist of setting the paper printed in the first multifunction peripheral Ua to the second multifunction peripheral Ub (specific coloring machine), is performed. Thereafter, the process proceeds to ST12.

In ST11, the display (refer to FIG. 6A), which has the gist of setting the designated type of recording sheet S1 to the second multifunction peripheral Ub, is performed. Thereafter, the process proceeds to ST12.

In ST12, it is determined whether or not "OK" input is performed in the displayed image. In a case of YES (Y), the process proceeds to ST13. In a case of NO (N), ST12 is repeated.

In ST13, the print data is transmitted to the second multifunction peripheral Ub. Thereafter, the process proceeds to ST14.

In ST14, it is determined whether or not print in another apparatus (first multifunction peripheral Ua) remains. In a case of YES (Y), the process proceeds to ST15. In a case of NO (N), the print control process ends.

In ST15, it is determined whether or not a notification of print completion is provided from the second multifunction peripheral Ub. In a case of YES (Y), the process proceeds to ST16. In a case of NO (N), ST15 is repeated.

In ST16, the display (refer to FIG. 6B), which has the gist of setting the paper printed in the second multifunction peripheral Ub to the first multifunction peripheral Ua (specific coloring machine), is performed. Thereafter, the process proceeds to ST6.

Effect of First Example

In the image forming system S according to the first example, which has the above configuration, the user is capable of setting the type of the recording sheet S1 to be used, the visual recognition direction, and the color tone as the image formation condition. Thereafter, the print sequence in the first multifunction peripheral Ua and the second multifunction peripheral Ub is automatically determined according to the visual recognition direction and the color tone. Thereafter, display is performed on the displays H2 and UIa according to the determined print sequence. Therefore, the user is capable of setting the recording sheet S1 on the multifunction peripheral Ua or Ub, which is in the print order, or capable of setting the printed recording sheet S1 to the multifunction peripheral Ua or Ub, in which print is subsequently performed, by checking the display. Accordingly, in a case where an image is formed in plural multifunction peripherals Ua and Ub, it is possible to reduce errors of an image forming sequence to the recording sheet S1, compared to a case where the using sequence of the multifunction peripherals Ua and Ub is not displayed.

Specifically, in a case where an image, which has various color tones, is realized by one image forming apparatus using the developers of gold, silver, white, and transparent in addition to Y, M, C, and K, the photoreceptors and the development devices corresponding to 8 colors are necessary, and thus the image forming apparatus becomes large. Therefore, whole price and costs of the image forming apparatus increase. In contrast, in the first example, the two 4-color image forming apparatuses which are widespread are used, and thus it is possible to realize the image which has various color tones. Accordingly, it is easy to reduce the whole price and costs in the first example using the two 4-color specification image forming apparatuses, which are spread, compared to an 8-color specification image forming apparatus which is not spread. Therefore, in the image forming system S according to the first example, it is possible to prevent costs from rising and it is possible to form an image under the image formation condition.

In addition, in the first example, with respect to the determined print sequence, the print information is transmitted to the multifunction peripheral Ua or Ub, in which print will be subsequently performed, and the print information is not transmitted to the multifunction peripheral Ua or Ub in which print will not be performed, thereby preventing print from being performed in the multifunction peripheral Ua or Ub in which print will not be performed. Accordingly, the image forming sequence is prevented from being erroneous order, the image being formed on the recording sheet S1.

Furthermore, in the first example, in a case where the user inputs the start key (input section) in the multifunction peripheral Ua or Ub, in which print will be subsequently performed, the image is formed. Therefore, it is possible for the user to start image formation while performing check. Accordingly, mistakes, such as forgetting to set the recording sheet S1, errors of an inside, an outside, and a direction of the recording sheet S1, are reduced, thereby reducing errors of the image forming sequence, compared to a case where the image is formed without check.

In addition, in the image forming system S according to the first example, the print sequence is automatically determined according to the designation in a case where the colors of gold, silver, and white (specific colors) become the base and the colors of gold, silver, and white are coated with respect to the developers of Y, M, C, and K (colored), and a case where the transparent developer is used.

Furthermore, the print sequence is automatically determined according to the visual recognition direction. In a case where the plural image forming apparatuses are used and the user transmits data to the respective multifunction peripherals Ua and Ub after determining the print sequence by the user, there is a risk that the print sequence becomes wrong. In contrast, in the first example, the print sequence is automatically determined, and the print sequence is transmitted to each of the multifunction peripherals Ua and Ub. Therefore, a print sequence error is reduced with respect to various image formation conditions.

Modification Example

Hereinabove, the example of the present invention is described in detail. However, the present invention is not limited to the example, and various changes are possible without departing from the gist of the present invention disclosed in claims. Modification examples (H01) to (H08) of the present invention are illustrated below.

(H01) In the example, each image is not limited to the illustrated example, and it is possible to change the image into any image according to design, specification, and the like.

(H02) In the example, although the multifunction peripheral, which has plural functions, is illustrated as the example of the image forming apparatus, the present invention is not limited thereto. For example, it is possible to apply the present invention to an image forming apparatus such as a copying machine, a printer, or a FAX.

(H03) In the example, although the type of the paper, the visual recognition direction, and the color tone are illustrated as examples of the image formation condition, the present invention is not limited thereto. It is possible to use any one or two image formation conditions, and it is possible to add another image formation condition. In addition, although the developers of the colors of gold, silver, white, and transparent are illustrated as developers to be used, the present invention is not limited thereto. For example, it is possible to use a colored developer (first developer) of a color of orange, green, or violet, it is possible to use a developer (a colored developer or a shading developer) of a color (a so-called corporate color) which is set as an image color by an own company of a business, or it is possible to use a developer (developer which visible light is penetrable) which absorbs infrared rays for forgery prevention. Therefore, it is possible to add and change the image formation condition according to the developer to be used. In addition, the transparent toner is used as the base as a usage which is not illustrated in the example, and thus it is possible to have an effect of trimming the image.

(H04) In the example, although a configuration, in which the respective images of FIGS. 5A to 5C are displayed, is illustrated, the present invention is not limited thereto. For example, in a case where transparent paper is not selected in FIG. 5A, the visual recognition direction corresponds to only the image surface side, it is possible to provide a configuration in which the color tone designation image 13 of FIG. 5C is displayed without displaying the visual recognition direction designation image 12 of FIG. 5B. In addition, it is possible to provide a configuration in which only a selectable purpose is displayed like a case where the metallic color is not displayed in the color tone designation image 13 in a case where an original image to be printed does not include the metallic color. Furthermore, in a case where the second multifunction peripheral Ub does not include the gold/silver developer, it is possible to perform display such that it is not possible to select the metallic color and the gold/silver stamp.

(H05) In the example, although a configuration is illustrated in which the print information is transmitted to only the multifunction peripheral, in which print is subsequently performed, in a case where the plural multifunction peripherals Ua and Ub are used, the present invention is not limited thereto.

For example, it is possible to provide a configuration in which the print information is simultaneously transmitted to the whole multifunction peripherals, a control signal indicative of prohibition of print is transmitted with respect to the multifunction peripheral which is not in the order, and a control signal indicative of release of the prohibition of print is transmitted with respect to the multifunction peripheral which is in the order. In addition, it is possible to provide a configuration in which the whole print information is transmitted from the client personal computer PC with respect to the multifunction peripheral in which print is initially performed, and a configuration in which the print information is transmitted from a multifunction peripheral, in which print is completed, with respect to a subsequent multifunction peripheral. That is, it is possible to provide a configuration in which the client personal computer PC does not manage transmission/reception of the print information and the print information is handed over between the multifunction peripherals, in which print is performed, like relay.

(H06) In the example, although a configuration is illustrated in which the user manually moves the recording sheet S1 between the plural multifunction peripherals Ua and Ub, the present invention is not limited thereto. It is also possible to provide a configuration in which a paper transportation apparatus connects between the multifunction peripherals Ua and Ub and transports paper, which is acquired after print is performed in any one of the multifunction peripherals, to another multifunction peripheral.

(H07) In the example, although a configuration is illustrated in which the user inputs the start key in a case of starting print in each of the multifunction peripherals Ua and Ub, the present invention is not limited thereto. It is possible to provide a configuration in which, in a case where a fact that paper is set in a predetermined specific paper feeding tray or a manual bypass tray is detected, the image formation is automatically started.

(H08) In the example, although a configuration is illustrated in which the two multifunction peripherals Ua and Ub are used, the present invention is not limited thereto. It is possible to provide a configuration in which three or more multifunction peripherals are used. In addition, although a configuration is illustrated in which the image forming system S is controlled in the client personal computer PC, the present invention is not limited thereto. For example, it is possible to provide a configuration in which the print server controls the print sequence of the multifunction peripherals Ua and Ub, transmission/reception of the print information, and the like by providing a print server between the client personal computer PC and the multifunction peripherals Ua and Ub. In addition, it is possible to provide a configuration in which the client personal computer PC does not designate the image formation condition and the operation parts UI (input section) of the multifunction peripherals Ua and Ub input the image formation condition.

The foregoing description of the exemplary examples of the present invention has been provided for the purposes of illustration and description. It is not intended to be exhaustive or to limit the invention to the precise forms disclosed. Obviously, many modifications and variations will be apparent to practitioners skilled in the art. The examples were chosen and described in order to best explain the principles of the invention and its practical applications, thereby enabling others skilled in the art to understand the invention for various examples and with the various modifications as are suited to the particular use contemplated. It is intended that the scope of the invention be defined by the following claims and their equivalents.

What is claimed is:

1. An image forming system comprising:
   a first image forming apparatus that includes a first imaging section used to form an image using a colored first developer;
   a second image forming apparatus that includes a second imaging section used to form the image using a second developer, which a color of the first developer is capable of penetrating, in a case of being laminated on the first developer on a medium, and a third imaging section used to form the image using a third developer which is capable of shading the color of the first developer in a case of being laminated on the first developer on the medium; and
   an information processing section that transmits information of a print image to the first image forming apparatus and the second image forming apparatus, the information processing section transmitting the information of the print image to the respective imaging sections such that, with respect to a visual recognition direction of the image on the medium, the image formed using the second developer is laminated on a front side in the visual recognition direction rather than the image formed using the third developer and the image formed using the first developer,
   wherein, in a case where the image formed using the third developer is laminated on a back side of a visual recognition direction rather than the image formed using the first developer, the information processing section transmits the information of the print image to each of the imaging sections from the second image forming apparatus such that the image is formed.

2. The image forming system according to claim 1, wherein, in a case where an image formed using the second developer exists, the information processing section transmits the information of the print image to each of the imaging sections such that the image is formed in order of the second image forming apparatus, the first image forming apparatus, and the second image forming apparatus.

3. The image forming system according to claim 2, wherein, in a case where the visual recognition direction is set to both sides of a surface of the medium, the information of the print image is transmitted to each of the imaging sections such that the images are laminated from a side of the medium in order of the image formed using the first developer, the image formed using the third developer, the image formed using the first developer, and the image formed using the second developer.

4. The image forming system according to claim 3, wherein the medium, on which the image is formed in one of the first image forming apparatus and the second image forming apparatus, is manually movable to a paper feeding section of another image forming apparatus.

5. The image forming system according to claim 2, wherein the medium, on which the image is formed in one of the first image forming apparatus and the second image forming apparatus, is manually movable to a paper feeding section of another image forming apparatus.

6. The image forming system according to claim 2, wherein, in the first image forming apparatus and second image forming apparatus, in a case where the information of the print image is transmitted to one image forming apparatus in which print is performed and the information of the print image is not transmitted to the other image forming apparatus, based on an image forming apparatus using sequence, and the image is completely formed in the one image forming apparatus, the print information is transmitted to the other image forming apparatus.

7. The image forming system according to claim 1, wherein, in a case where the visual recognition direction is set to both sides of a surface of the medium, the information of the print image is transmitted to each of the imaging sections such that the images are laminated from a side of the medium in order of the image formed using the first developer, the image formed using the third developer, the image formed using the first developer, and the image formed using the second developer.

8. The image forming system according to claim 7, wherein the medium, on which the image is formed in one of the first image forming apparatus and the second image forming apparatus, is manually movable to a paper feeding section of another image forming apparatus.

9. The image forming system according to claim 1, wherein, in a case where the visual recognition direction is set to both sides of a surface of the medium, the information of the print image is transmitted to each of the imaging sections such that the images are laminated from a side of the medium in order of the image formed using the first developer, the image formed using the third developer, the image formed using the first developer, and the image formed using the second developer.

10. The image forming system according to claim 9, wherein the medium, on which the image is formed in one of the first image forming apparatus and the second image forming apparatus, is manually movable to a paper feeding section of another image forming apparatus.

11. The image forming system according to claim 1, wherein the medium, on which the image is formed in one of the first image forming apparatus and the second image forming apparatus, is manually movable to a paper feeding section of another image forming apparatus.

12. The image forming system according to claim 1, wherein the medium, on which the image is formed in one of the first image forming apparatus and the second image forming apparatus, is manually movable to a paper feeding section of another image forming apparatus.

13. The image forming system according to claim 1, wherein, in the first image forming apparatus and second image forming apparatus, in a case where the information of the print image is transmitted to one image forming apparatus in which print is performed and the information of the print image is not transmitted to the other image forming apparatus, based on an image forming apparatus using sequence, and the image is completely formed in the one image forming apparatus, the print information is transmitted to the other image forming apparatus.

14. The image forming system according to claim 13, further comprising:

an input section that is provided in the other image forming apparatus and performs input to start forming the image in the other image forming apparatus.

15. The image forming system according to claim 1, wherein, in the first image forming apparatus and second image forming apparatus, in a case where the information of the print image is transmitted to one image forming apparatus in which print is performed and the information of the print image is not transmitted to the other image forming apparatus, based on an image forming apparatus using sequence, and the image is completely formed in the one image forming apparatus, the print information is transmitted to the other image forming apparatus.

16. The image forming system according to claim 1, wherein, in the first image forming apparatus and second image forming apparatus, in a case where information for enabling to perform print in one image forming apparatus, in which print is previously performed, and for prohibiting performing print in the other image forming apparatus, in which print is subsequently performed, is transmitted based on an image forming apparatus using sequence, and the image is completely formed in the one image forming apparatus, print in the other image forming apparatus is possible.

17. The image forming system according to claim 16, further comprising:
an input section that is provided in the other image forming apparatus and performs input to start forming the image in the other image forming apparatus.

18. An image forming system comprising:
a first image forming apparatus that includes a first imaging section used to form an image using a colored first developer;
a second image forming apparatus that includes a second imaging section used to form the image using a second developer, which a color of the first developer is capable of penetrating, in a case of being laminated on the first developer on a medium, and a third imaging section used to form the image using a third developer which is capable of shading the color of the first developer in a case of being laminated on the first developer on the medium; and
an information processing section that transmits information of a print image to the first image forming apparatus and the second image forming apparatus, the information processing section transmitting the information of the print image to the respective imaging sections such that, with respect to a visual recognition direction of the image on the medium, the image formed using the third developer is laminated on a back side in the visual recognition direction rather than the image formed using the first developer and the image formed using the second developer is laminated on a front side in the visual recognition direction rather than the image formed using the first developer,
wherein, in a case where the image formed using the third developer is laminated on a back side of a visual recognition direction rather than the image formed using the first developer, the information processing section transmits the information of the print image to each of the imaging sections from the second image forming apparatus such that the image is formed.

19. The image forming system according to claim 18, wherein the medium, on which the image is formed in one of the first image forming apparatus and the second image forming apparatus, is manually movable to a paper feeding section of another image forming apparatus.

* * * * *